US009154948B2

(12) United States Patent
Khare et al.

(10) Patent No.: US 9,154,948 B2
(45) Date of Patent: Oct. 6, 2015

(54) METHOD AND SYSTEM FOR USER AUTHENTICATION

(75) Inventors: Rajendra Kumar Khare, Bangalore (IN); Abhijit Das, Bangalore (IN); Vikas Minda, Bangalore (IN); Tushar Vyas, Bangalore (IN)

(73) Assignee: INDUSEDGE INNOVATIONS PRIVATE LIMITED, Bangalore, Karnataka (IN)

( * ) Notice: Subject to any disclaimer, the term of this patent is extended or adjusted under 35 U.S.C. 154(b) by 688 days.

(21) Appl. No.: 12/741,207

(22) PCT Filed: Nov. 4, 2008

(86) PCT No.: PCT/IN2008/000732
§ 371 (c)(1),
(2), (4) Date: Aug. 9, 2010

(87) PCT Pub. No.: WO2009/057147
PCT Pub. Date: May 7, 2009

(65) Prior Publication Data
US 2011/0154460 A1    Jun. 23, 2011

(30) Foreign Application Priority Data

Nov. 4, 2007  (IN) .......................... 2517/CHE/2007

(51) Int. Cl.
*H04W 12/06* (2009.01)
*G06F 21/31* (2013.01)
*H04L 9/32* (2006.01)
*H04L 29/06* (2006.01)
*H04W 84/18* (2009.01)

(52) U.S. Cl.
CPC ............... *H04W 12/06* (2013.01); *G06F 21/31* (2013.01); *H04L 9/3226* (2013.01); *H04L 63/0492* (2013.01); *H04L 63/0861* (2013.01); *H04W 84/18* (2013.01)

(58) Field of Classification Search
CPC ......... G06F 21/30; G06F 21/31; G06F 21/32; G06F 21/34; G06F 21/35; H04L 9/32; H04L 9/3226–9/3231; H04W 12/00; H04W 12/06
USPC ......... 713/168, 185, 186; 726/9, 15; 455/411; 705/50, 56, 64–67
See application file for complete search history.

(56) References Cited

U.S. PATENT DOCUMENTS

| | | | |
|---|---|---|---|
| 6,871,063 B1* | 3/2005 | Schiffer ......................... | 455/410 |
| 7,548,890 B2* | 6/2009 | Shakkarwar ..................... | 705/75 |
| 8,561,127 B1* | 10/2013 | Agrawal et al. .................. | 726/1 |
| 2002/0126845 A1* | 9/2002 | Hue et al. ....................... | 380/247 |
| 2004/0002897 A1* | 1/2004 | Vishik ............................ | 705/14 |
| 2005/0250472 A1* | 11/2005 | Silvester et al. .............. | 455/411 |

FOREIGN PATENT DOCUMENTS

GB    2408129 A  *  5/2005  ............... G06F 1/00

* cited by examiner

*Primary Examiner* — Ashok Patel
*Assistant Examiner* — Daniel Potratz
(74) *Attorney, Agent, or Firm* — Barry Choobin; Patent360 LLC

(57) ABSTRACT

Method and system for user authentication using one or more unique ID's associated with one or more electronic devices connected in a communication network, more specifically in short range radio communication network. the method comprising the steps of polling and detection of a short range wireless electronic device within a short range radio communication network, establishing a connection between such short range wireless electronic device with a centralized server, authenticating the short range wireless device ID, requesting further the user to feed a pre-determined authentication code, verifying the fed authentication code with corresponding entries in the database of the central server, establishing an encrypted channel if authentication code found in such database, receiving a user authentication certificate from the wireless electronic device.

12 Claims, 5 Drawing Sheets

METHOD AND SYSTEM FOR USER AUTHENTICATION

CROSS REFERENCE TO RELATED APPLICATION

This application is related to Indian Provisional Patent Application No. 2517/CHE/2007 dated Nov. 4, 2007. The entire contents of which are incorporated herein by this reference. The applicant hereby claims the benefit of this earlier pending provisional application.

FIELD OF THE INVENTION

The instant invention relates to method and system for user authentication using one or more unique ID's associated with one or more electronic devices connected in a communication network, more specifically in short range radio communication networks such as Bluetooth.

BACKGROUND OF THE INVENTION

The tremendous developments in the fields of the communications have enabled global connectivity and instant delivery of requisite information to users. Mobile, Internet, General Packet Radio Service (GPRS), WAP services provide users with unending and unlimited information at the touch of a button. These services are provided through various service providers or require explicit pulling of information by the user from the network. However, the number and type of services provided by individual service providers is limited. Further, such services come at an expense and require considerable network bandwidth. Moreover, reception and transmission of information over such networks is suspect amongst common users and is considered insecure.

Hence there is a need for a system and method to deliver useful information through an inexpensive and secure means of communication. Further there is a need for a system and method that should be able to accurately identify each user and deliver customised information which may be used for further processing.

Further limitations and disadvantages of conventional and traditional approaches will become apparent to one skilled in the art, through comparison of such systems with some aspects of the present invention. The novel and inventive features believed characteristics of the invention are set forth in the appended claims. The invention itself, however, as well as preferred modes of use, further objects and advantages thereof, will be best understood by reference to the following detailed description of illustrative embodiments when read in conjunction with the accompanying drawings.

SUMMARY OF THE INVENTION

The system and method of the present invention facilitates secure user authentication using one or more unique ID's associated with one or more devices connected in a communication network, more specifically in short range radio communication networks such as Bluetooth. Two or more levels of authentication may be employed to uniquely and accurately identify a user and provide enhanced security for transmission and reception of information.

Briefly, one exemplary embodiment relates to a method for user authentication using one or more unique ID's associated with one or more electronic devices connected in a communication network, the method comprising the steps of polling and detection of a short range wireless electronic device within a short range radio communication network, establishing a connection between such short range wireless electronic device with a centralized server, authenticating the short range wireless device ID, requesting further the user to feed a pre-determined authentication code, verifying the fed authentication code with corresponding entries in the database of the central server, establishing an encrypted channel if authentication code found in such database, receiving a user authentication certificate from the wireless electronic device.

Another exemplary embodiment relates to a system for user authentication using one or more unique ID's associated with one or more electronic devices connected in a communication network, the system comprising a short range wireless electronic device, a database coupled with the central server, one or more processor.

It is an objective of the instant invention to use a unique ID associated with a user's Bluetooth enabled short range wireless electronic device in combination with the unique ID associated with one or more components coupled with the user device to accurately authenticate the user. The multiple levels of authentication can provide added security capabilities to the system.

It is another objective of the instant invention to associate the combination of the Bluetooth ID and unique ID associated with one or more components of the user device with user information residing in one or more systems/servers such as transaction servers and databases of service providers.

It is yet another objective of the instant invention to deliver customized information to the user device through permission based interactive mechanism.

BRIEF DESCRIPTION OF ACCOMPANYING DRAWINGS

Non-limiting and non-exhaustive features of the present invention together with its objects and advantages are described with reference to the accompanying drawings, like reference numerals refer to like elements throughout the various figures unless otherwise specified and wherein.

DETAILED DESCRIPTION OF THE INVENTION

A method and system for user authentication using one or more unique ID's associated with one or more electronic devices connected in a communication network, more specifically in short range radio communication networks such as Bluetooth.

In the following description for purposes of explanation, specific details are set forth in order to provide a thorough understanding of the present invention. It will be evident, however, to one skilled in the art that the present invention may be practiced without these specific details. In other instances, well known methods, procedures, components and circuits have not been described in detail so as not to obscure the present invention.

The present invention now will be described more fully hereinafter with reference to the accompanying drawings, which form a part hereof, and which show, by way of illustration, specific exemplary preferred embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. The following detailed description is, therefore, not to be taken in a limiting sense.

A communication network may have confidential applications and data stored in the system's memory or on a mass storage device. To prevent unauthorized access, most communication networks only require the user to provide a username and a password. The user name and password is then matched against a database of authorized usernames and corresponding passwords. Thus, a person who wishes to steal confidential information from a communication network system would only need the user's username and password to gain access. A variety of unscrupulous methods exist to steal or alter the username and password for malicious intent. Additional levels of protection would help to prevent theft of confidential information.

Figure 1:
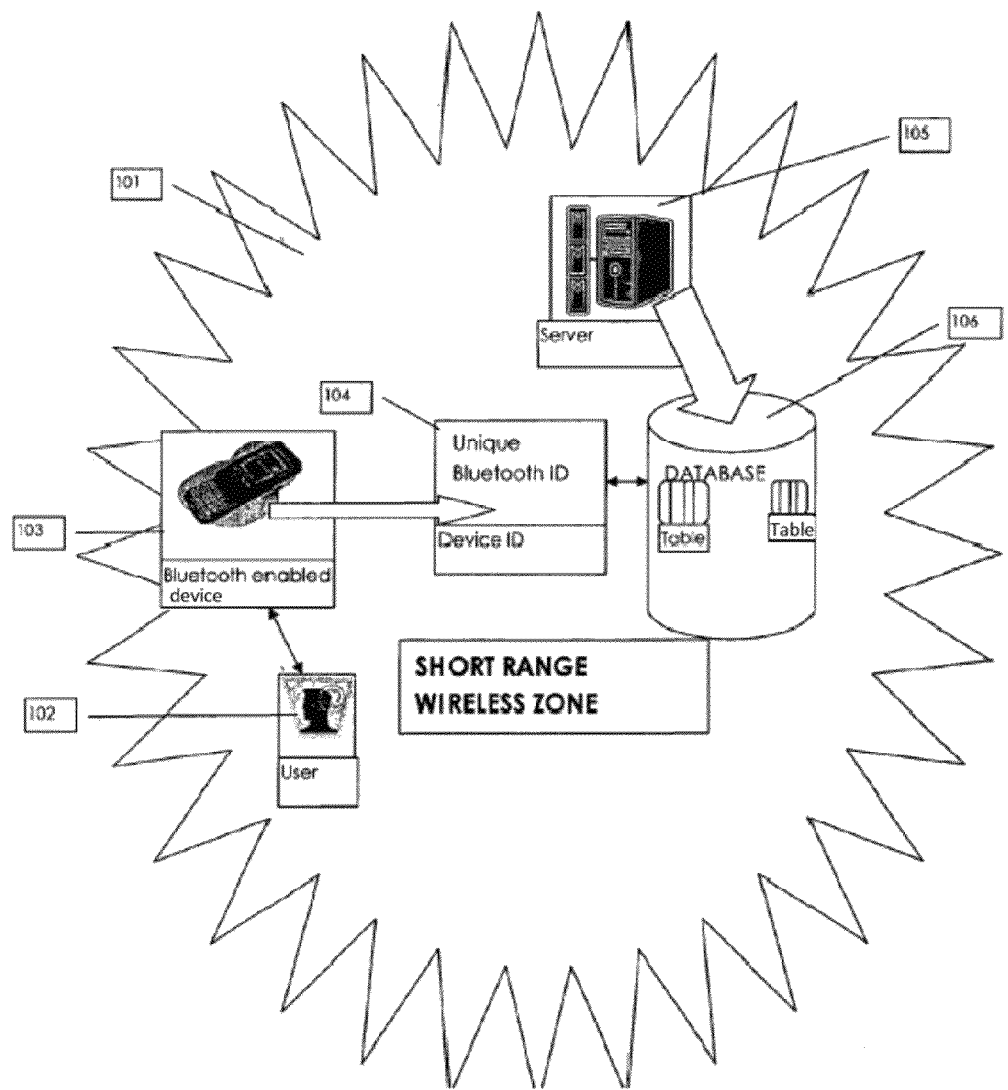
FIGS. 1 and 2 are system diagrams of preferred embodiments of an environment in which the instant invention may be practiced.
Figure 2:
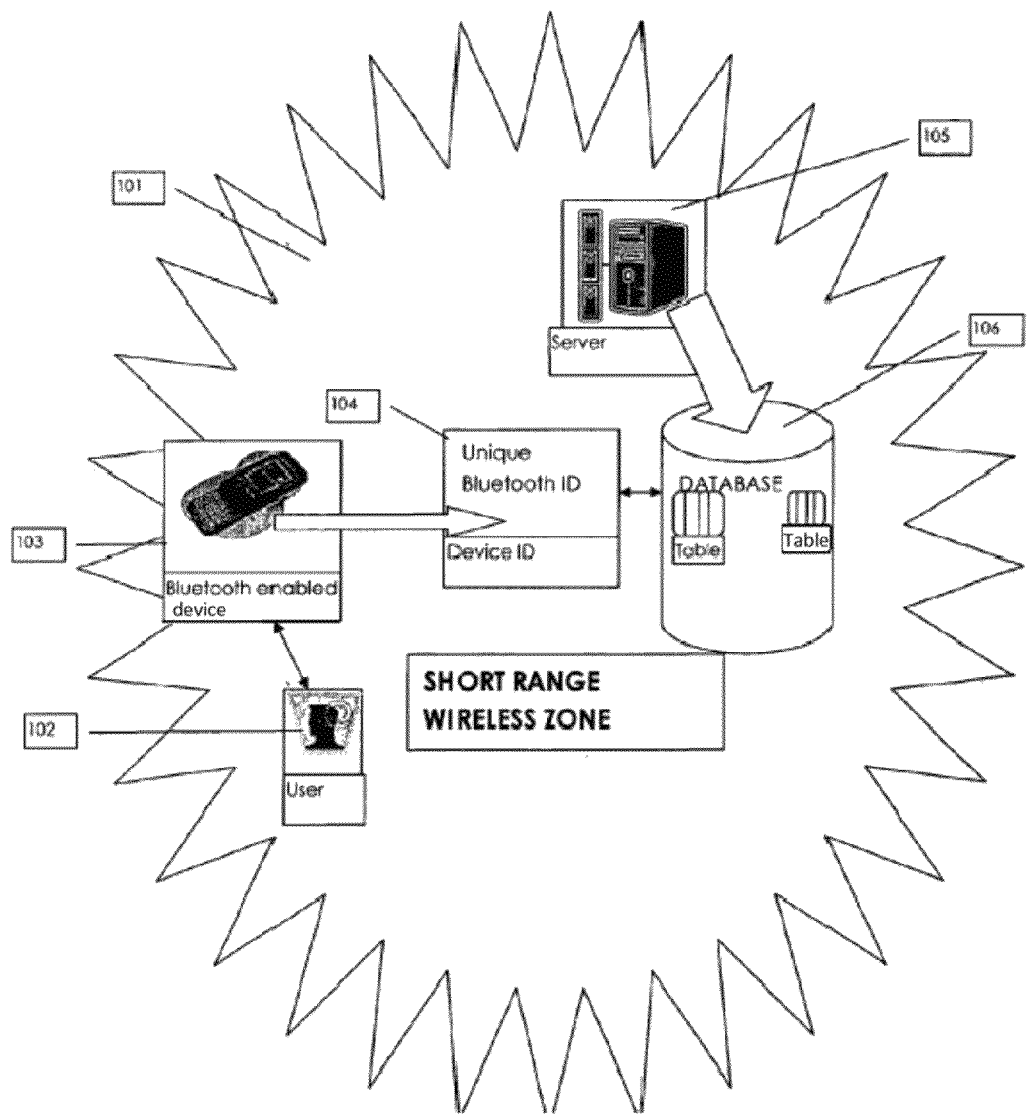

FIGS. 1 and 2 depict system 101 diagrams of preferred embodiments of an environment in which the instant invention may be practiced. The system 101 requires a short range wireless electronic device 103 to provide certain user authentication information before a user is given access to the communication network. The system 101 for user authentication using one or more unique ID's 104 associated with one or more electronic devices 103 connected in a communication network, may comprise a short range wireless electronic device 103, a database 106 coupled with the central server 105, one or more processor.

For one embodiment of the invention, the short range wireless electronic device 103 may be a Bluetooth electronic device. Bluetooth is a short-range wireless communication specification for connecting electronic devices. Wireless links are made possible thorough wireless protocols such as wireless local area network (WLAN), wireless wide area network (WWAN), Bluetooth and the like.

For another embodiment of the invention, the short-range wireless electronic device 103 may be a WLAN compatible device.

For yet another embodiment of the invention, the short-range wireless electronic device 103 may be a WWAN compatible device.

Figure 3:
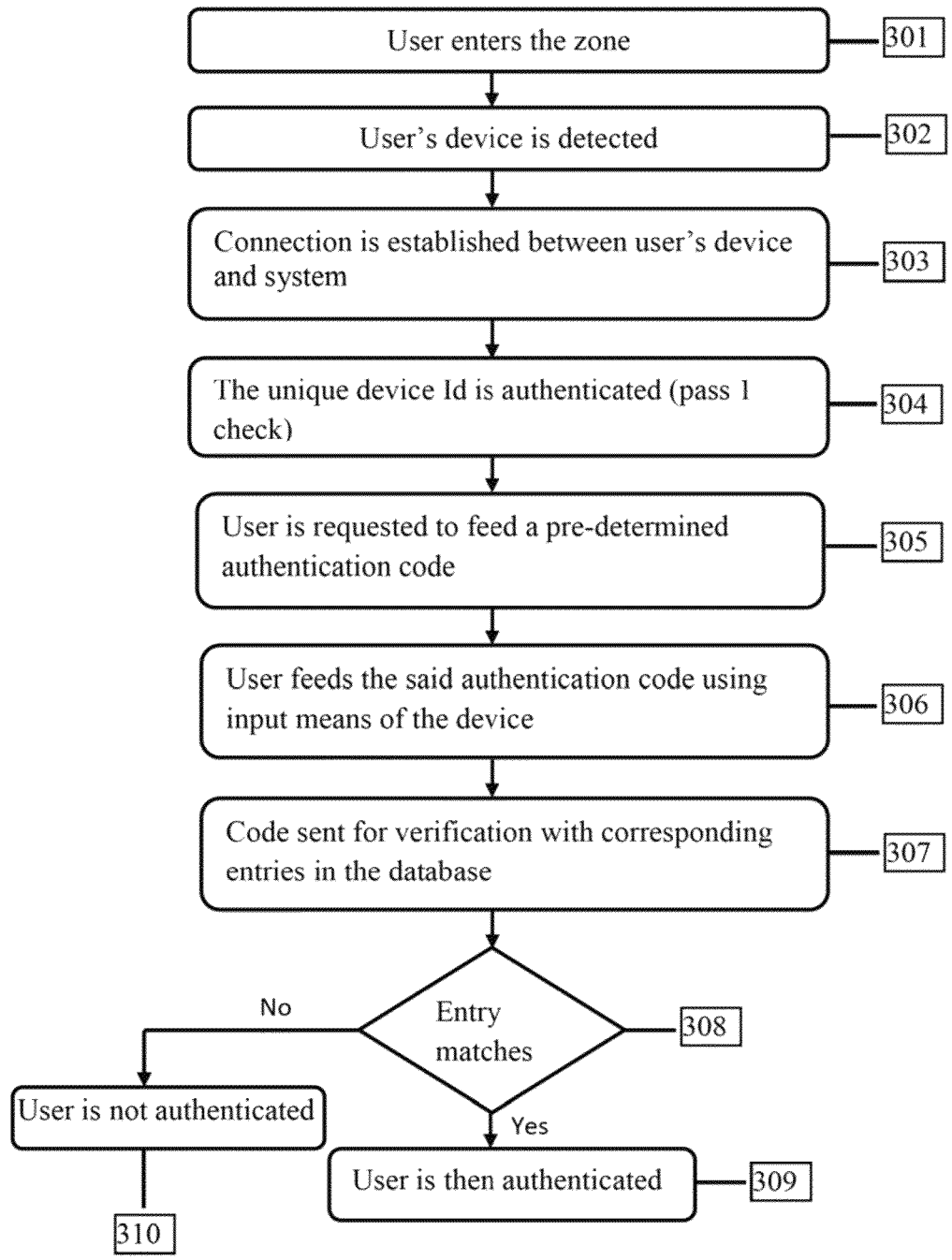
FIG. 3 illustrates a logical flow diagram of a preferred mode of the method used to authenticate the user's short range wireless communication device preferably thorough a secure connection.

FIG. 3 illustrates a logical flow diagram of a preferred mode of the method used to authenticate the user's short range wireless communication device preferably through a secure connection. The method for user authentication uses one or more unique ID's associated with one or more electronic devices connected in a communication network, the method may comprise the steps of polling 301 and detection 302 of a short range wireless electronic device within a short range radio communication network, establishing 303 a connection between such short range wireless electronic device with a centralized server, authenticating 304 the short range wireless device ID, requesting 305 further the user to feed a pre-determined authentication code, verifying the fed 306 authentication code with corresponding entries in the database of the central server 307, establishing an encrypted channel if authentication code found in such database 308, receiving a user authentication certificate 309 from the wireless electronic device.

Figure 4:
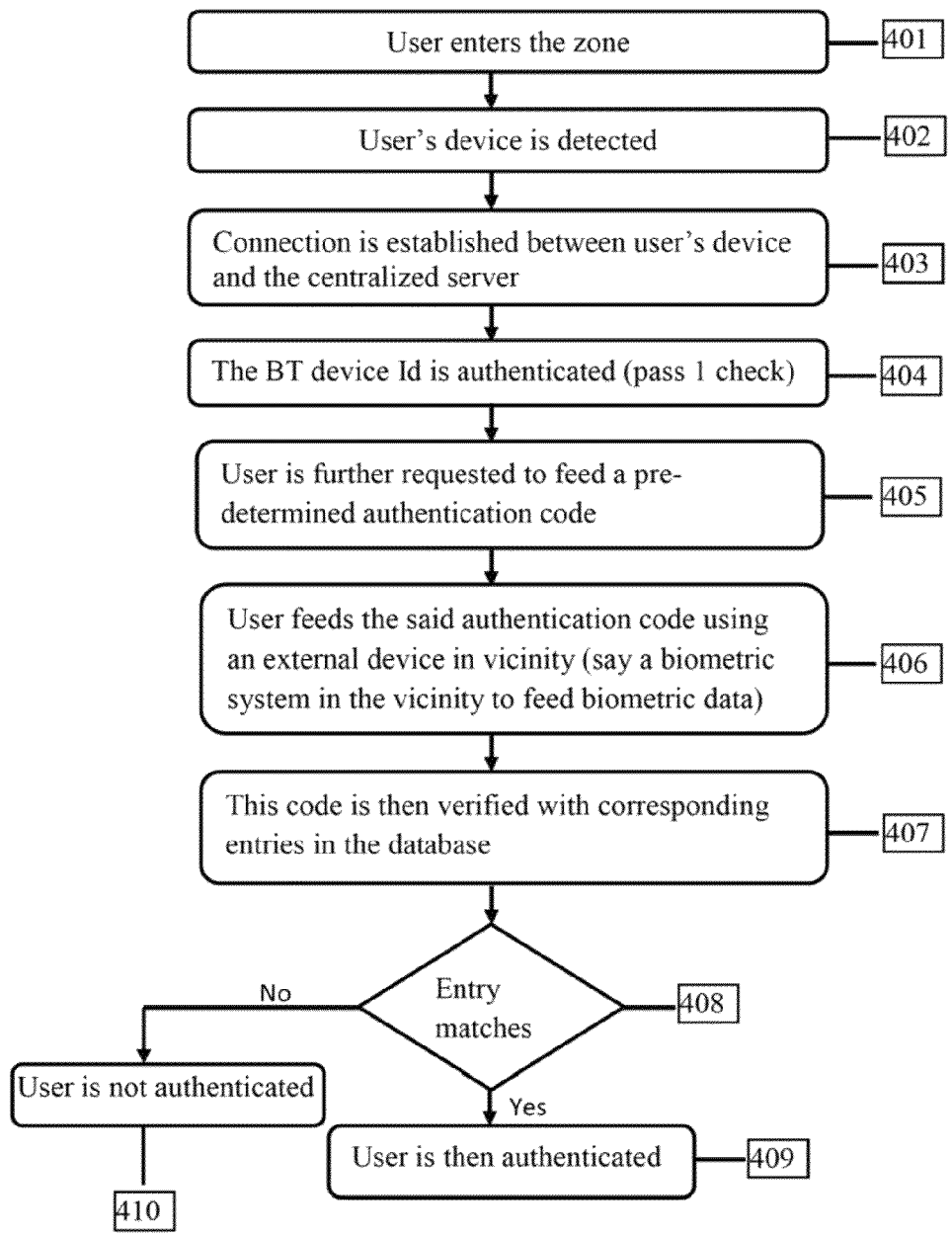
FIG. 4 illustrates a preferred mode of the method used to authenticate the user's short range wireless communication device using biometric system having biometric data.

FIG. 4 illustrates a preferred mode of the method used to authenticate the user's short range wireless communication device using biometric system having biometric data. The method for user authentication uses one or more unique ID's associated with one or more electronic devices connected in a communication network, the method may comprise the steps of polling 401 and detection 402 of a short range wireless electronic device within a short range radio communication network, establishing 403 a connection between such short range wireless electronic device with a centralized server, authenticating 404 the short range wireless device ID, requesting 405 further the user to feed a pre-determined authentication code using an external device in the vicinity such as a biometric system to feed biometric data, verifying the fed 406 authentication code with corresponding entries in the database of the central server 407, establishing an encrypted channel if authentication code found in such database 408, receiving a user authentication certificate 409 from the wireless electronic device.

The wireless electronic device 103 may require the user to provide other forms of authentication before the user credentials are released to wireless communication network. The wireless electronic device 103 may include a method to measure biometric characteristics of the user, such as fingerprint or face scan. The user enrolls his/her biometric characteristic. For example, the user may touch a fingerprint sensor on the wireless electronic device 103. The wireless electronic device 103 then securely stores the biometric template. Subsequent authentication attempts may require matching a newly captured biometric template against the enrolled template to validate the user.

Figure 5:
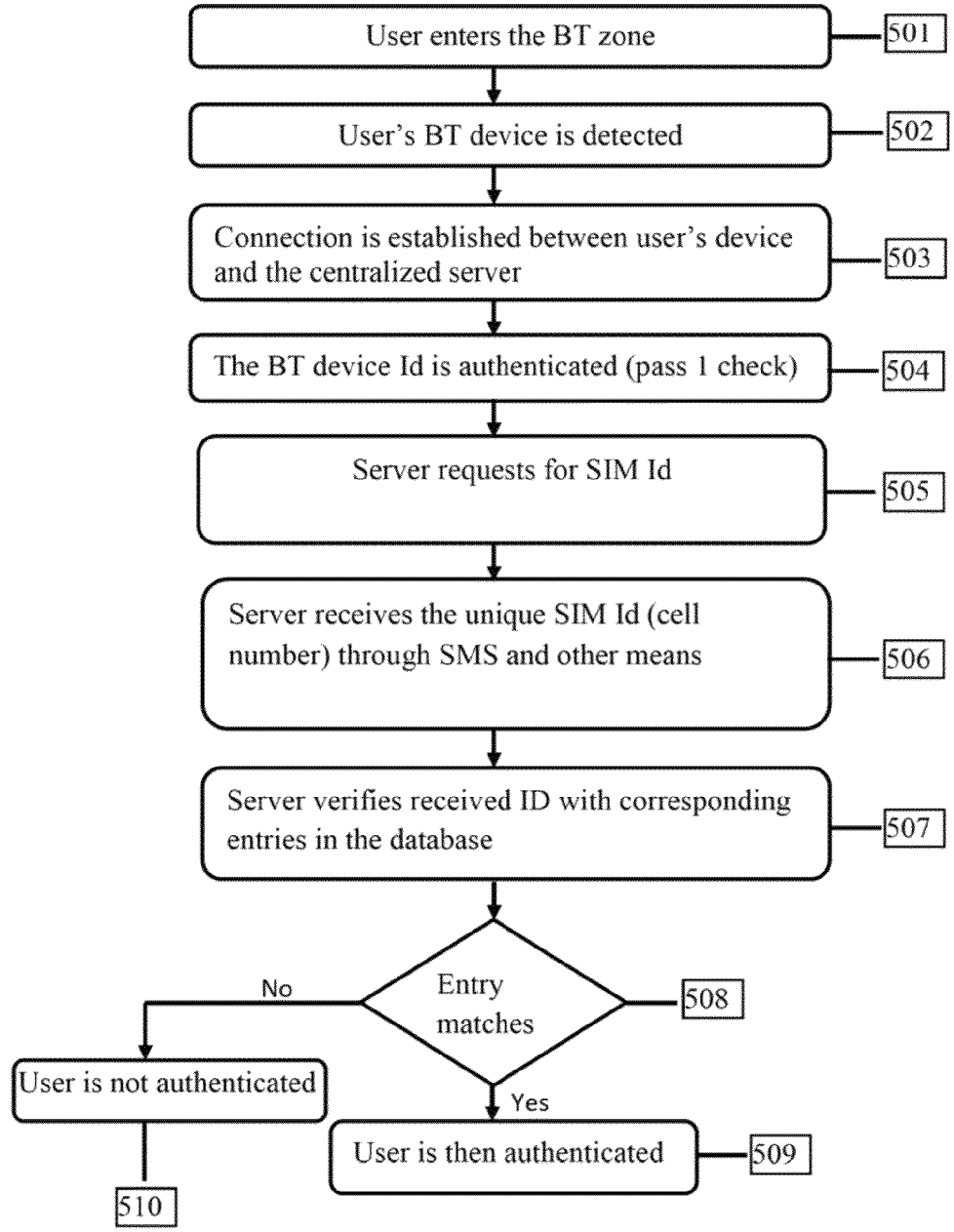
FIG. 5 illustrates a preferred mode of the method used to authenticate the user's short range wireless communication device using SIM ID through SMS and/or other means.

FIG. 5 illustrates a preferred mode of the method used to authenticate the user's short range wireless communication device using SIM ID through SMS and/or other means. The method for user authentication uses one or more unique ID's associated with one or more electronic devices connected in a communication network, the method may comprise the steps of polling 501 and detection 502 of a short range wireless electronic device within a short range radio communication network, establishing 503 a connection between such short range wireless electronic device with a centralized server, authenticating 504 the short range wireless device ID, requesting 505 further the user to feed a pre-determined authentication code such as SIM ID, verifying the fed 506 authentication code with corresponding entries in the database of the central server 507, establishing an encrypted channel if authentication code found in such database 508, receiving a user authentication certificate 509 from the wireless electronic device.

In an embodiment, the unique (Bluetooth) ID of a user's mobile terminal may be used in combination with unique number on the SIM card to authenticate a specific user at a Bluetooth enabled service location. The unique (Bluetooth) ID may be used in conjunction with other unique parameters of the device for authentication of the user.

A central server may store the user authentication details such as his Bluetooth ID and SIM card number and associated information such as name, age, location, preferences, transaction history, and medical profile etc. Alternatively, the associated information may be stored in user's device. The Bluetooth enabled service location may be further connected to the central server. The service location may be configured to detect a user's Bluetooth enabled device terminal present within a region of service location. The service location may communicate the detected unique (Bluetooth) ID and other authentication details of the user to the central server to determine if said user is registered/eligible to receive services at the service location.

If the user is not registered, permission may be sought from the user for delivery of useful information. Subsequent to receiving permission from the user, customized information may be delivered to the user interactively. The information may be based on plurality of factors such as the location of the user, detected characteristics of the user device such as model and screen size, service location, weather, local demographics and so on. If the user is authenticated, associated information stored in the central server may be used to customize information to be delivered to the user. Alternatively, the user may select the type of information he requires through pre-stored menus/options in his wireless electronic device.

The user authentication based on Bluetooth ID and associated SIM card number or other unique parameter of the user's mobile terminal may be used in a corporate environment to selectively deliver information to users. The same may be used as means of authentication to enable entry at restricted locations. The above means of authentication may be further linked to a transaction account such as a salary account of the user.

Processing of transactions may proceed after positive authentication of user and optionally further entry authentication code such as a PIN or biometric data. When the user device's presence is detected and authenticated using the unique (Bluetooth) ID and one or more parameters such as SIM card number in a service location connected to the central server, customized information may be delivered directly to the user's device after interactively securing user's permission. Such services may include value added services, information of services available in the vicinity such as campaigns, advertisements etc. Further, instant offers based on user's transaction history and user's response to previous offers may be used to customize information.

The user may be billed to the associated transaction account with transaction processing in real or deferred time. The unique Bluetooth ID and SIM card combination may be used to authenticate the user and retrieve electronic points and/or coupons stored in the central server or user device. Specific offers may be made to the user at location of transaction to redeem or update the electronic points/coupons such as a point of sale terminal. The process of detection and transmission and reception of information may happen over a short range network such as via Bluetooth.

Although, the invention has been described with reference to specific examples, it would be appreciated by those skilled in the art that the invention may be embodied in many forms without departing from the broader spirit and scope of the invention as set forth in the invention. Preferred embodiments of this invention have been described herein, including the best mode known to the inventor for carrying out the invention. Variations of those preferred embodiments may become apparent to those of ordinary skill in the art upon reading the foregoing description.

Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context. Accordingly, the specification and drawings are to be regarded in an illustrative rather than a restrictive sense without departing from the spirit and scope of the invention, the invention resides in the claims hereinafter appended.

We claim:

1. A method for user authentication using one or more unique identifiers (ID's) associated with one or more electronic devices connected in a communication network, the method comprising the steps of:
    polling and detecting of a short range wireless electronic device within a short range radio communication network, wherein the short range wireless electronic device is a Bluetooth enabled mobile phone;
    establishing a connection between the short range wireless electronic device and a central server;
    communicating, from the short range wireless electronic device to the central server, a short range wireless ID a SIM card number, wherein the short range wireless ID and the SIM card number are associated with the short range wireless electronic device;
    authenticating, by the central server, the short range wireless device ID and the SIM card number, wherein the short range wireless device ID is a Bluetooth ID;
    in response to authenticating the short range wireless device ID, requesting a user to input a pre-determined authentication code or biometric data using the short range wireless electronic device, wherein the biometric data includes a finger print or a face scan;
    verifying the pre-determined authentication code or the biometric data with a corresponding entry in a database of the central server;
    establishing, between the short range wireless electronic device and the central server, an encrypted channel if the pre-determined authentication code or the biometric data is found in the database;
    in response to establishing the encrypted channel, receiving, by the central server, a user authentication certificate from the short range wireless electronic device; and
    delivering, by a Bluetooth enabled service location communicating with the central server customized information and a service directly to the user at the Bluetooth enabled service location after authenticating the short range wireless device ID and the SIM card number, wherein the service includes value added services and information of services available at the Bluetooth enabled service location wherein the information of services includes campaigns and advertisements, and wherein the customized information includes an instant offer based on a transaction history of the user and a response of the user for a previous offer.

2. The method as claimed in claim 1, wherein the user inputs the pre-determined authentication code or biometric data using an input means of the short range wireless electronic device.

3. The method as claimed in Claim 1, wherein the user inputs the pre-determined authentication code or biometric data using an external device.

4. The method as claimed in claim 1, wherein the central server receives a unique SIM ID through a SMS.

5. The method. as claimed in claim 4, wherein the central server verifies the received unique SIM ID with a corresponding entry in the database.

6. A system for user authentication using one or more unique ID's associated with one or more electronic devices connected in a communication network, the system comprising:

a short range wireless electronic device, wherein the short range wireless electronic device is a Bluetooth enabled mobile phone;

a database coupled with a central server;

one or more processors;

wherein the central server receives a short range wireless ID and a SIM card number from the short range wireless electronic device, wherein the short range wireless ID and the SIM card number are associated with the short range wireless electronic device, wherein the short range wireless ID is a Bluetooth ID, wherein the central server authenticates the short range wireless ID and the SIM card number, wherein in the central server requests a user to input a pre-determined authentication code or biometric data using the short range wireless electronic device, in response to authenticating the short range wireless device ID, wherein the biometric data includes a finger print or a scan, wherein the central server verifies the pre-determined authentication code or the biometric data with a corresponding entry in the database of the central server, wherein the processor establishes an encrypted channel between the short range wireless electronic device and he central server, if the pre-determined authentication code or the biometric data is found in the database, wherein the central server, in response to establishing the encrypted channel, receives a user authentication certificate from the short range wireless electronic device, wherein a customized information and a service are delivered directly to the user at the Bluetooth enabled service location communicating with the central server, after authenticating the short range wireless device ID and the SIM card number, wherein the service includes value added services and information of services available at the Bluetooth enabled service location, wherein the information of services includes campaigns and advertisements, and wherein the customized information includes an instant offer based on a transaction history of the user and a response of the user for a previous offer.

7. The system as claimed in claim 6, wherein the server comprises a database of approved short range wireless electronic devices for communication.

8. The system as claimed in claim 6, further comprising a secondary input means.

9. The system as claimed in claim 8, wherein the secondary input means comprises a biometric system to feed the biometric data.

10. The system as claim in claim 6 wherein the central server polls for a short range wireless communication device matches an identification of a located short range wireless communication device and decrypts an encrypted data sent by the short range wireless communication. device.

11. The system as claimed in claim 6, wherein the central server establishes a short range wireless communication link.

12. The system as claimed in claim 6, wherein the central server authenticates the data sent by a short range wireless communication device.

* * * * *